United States Patent Office 2,728,975
Patented Jan. 3, 1956

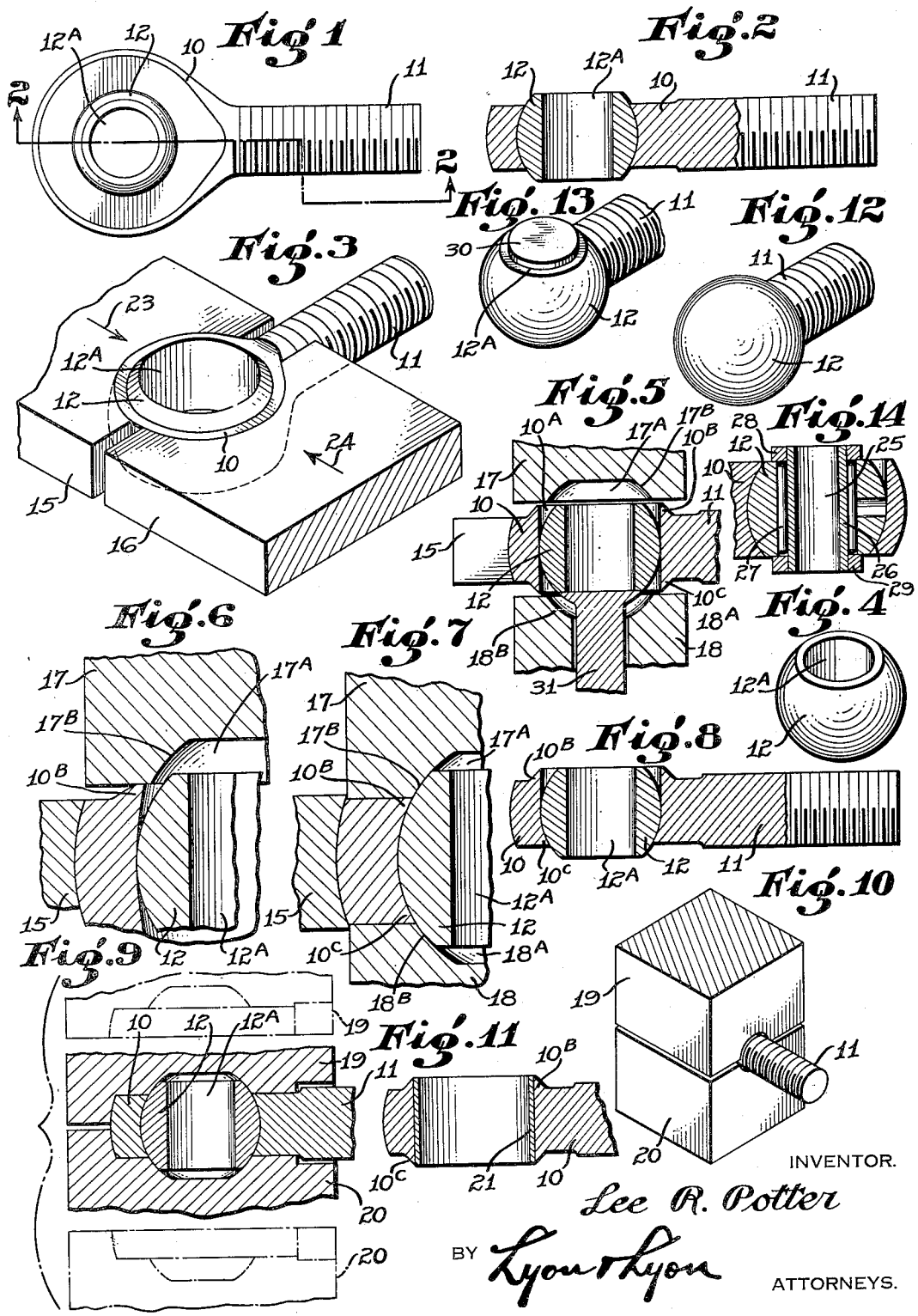

2,728,975
METHOD FOR MAKING TWO PIECE ROD END BEARINGS

Lee Russell Potter, Pasadena, Calif.

Application December 27, 1949, Serial No. 135,174

2 Claims. (Cl. 29—149.5)

The present invention relates to an improved method for making two piece rod end bearings.

Bearings of the universal type which comprise a ball shaped member rotatably maintained in a race member have been widely used in industry. Such universal type of bearings, heretofore, included many different forms and shapes of inserts between such ball shaped member and the surrounding race member. The use of such inserts in the prior art arrangements is necessitated largely because of the problems arising in the assembly of the ball shaped member into the race member. The use of such inserts disposed between the ball shaped member and the outer race member results in a relatively costly item and a relatively long time within which to manufacture the component parts and to assemble the same. Furthermore, the use of such inserts necessitates a capital investment in such inserts and, more important, results in a structure to which limited forces may be applied.

It is therefore an object of the present invention to provide an improved method for making a two piece rod end bearing structure of the type mentioned above, characterized by the fact that the assembly and use of such bearing structure does not necessitate the incorporation therein of inserts, but, in accordance with the novel teachings presented herein, the finished bearing structure comprises simply the ball shaped bearing member in direct rotatable contact with the race member, with the result that a less expensive and stronger bearing structure is obtained.

A corollary object of the present invention is to provide an improved method for making a two piece rod end bearing of the type outlined in the preceding object to obtain the indicated results.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in plan elevation of a universal type of two piece rod end bearing embodying the present invention.

Figure 2 is a view taken substantially on the line 2—2 of Figure 1.

Figures 3, 4, 5, 6 and 7 indicate the steps taken in producing the bearing shown in Figures 1 and 2.

Figure 8 is a cross sectional view, similar to the cross sectional view shown in Figure 2, to demonstrate the fact that both ball retaining lips may be formed at the same time or at separate times.

Figures 9 and 10 show a different type of die structure for obtaining the same results as obtained by the die structures shown by the use of the dies in Figures 3–7 inclusive.

Figure 11 is a cross-sectional view of a race member 10 modified in accordance with teachings of the present invention.

Figure 12 is a perspective view of a different type of bearing member which may be used with the different types of races shown herein, it being noted that the member has a solid core with an integrally formed projecting shank.

Figure 13 is a perspective view of a bearing member of the type shown in Figure 4, but with an auxiliary plug inserted therein to achieve predetermined tolerances between the race and the bearing member.

Figure 14 shows a needle bearing disposed within an apertured ball 12 to achieve other features of the present invention.

A characterizing feature of the present invention is that the finished two piece rod end bearing structure incorporates only two elements, namely a ball shaped inner member rotatably maintained in direct contact with a surrounding race member without an intermediate insert of the type used heretofore in the prior art devices. The race member has the reference numeral 10 in the various drawings and may optionally include a threaded stud 11. The ball shaped member rotatably retained in the finished bearing structure has the reference numeral 12, and conventionally may have a cylindrical aperture 12A therethrough for convenient fastening.

The finished bearing structure, incorporating the present invention, and shown in detail in Figures 1 and 2, may be produced using the combination of holding dies 15, 16 and pressing dies 17, 18, in accordance with the method outlined in Figures 3–7 inclusive, or alternatively, instead of using a combination of such dies, the same result may be accomplished using a single pair of die members 19, 20, as illustrated in Figures 9 and 10.

Referring specifically to Figure 5, the race member 10 is formed with a cylindrical aperture 10A therethrough, the mouths of which are defined by generally triangularly shaped cross-sectioned lips 10B, 10C. The particular shape and presence of such lips 10B, 10C are of importance in producing the major novel results of the present invention.

The first step in assembling the ball 12 in its race member 10, following the method outlined in Figures 3–7 inclusive, consists in first disposing the preformed race member 10 having the annular triangularly cross-sectioned lips 10B, 10C thereon between the holding dies 15, 16, which are pressed against the race member 10 in the direction indicated by the arrows 23, 24. The second step consists in heating the ball 12 to a temperature in the neighborhood of 200° F., to expand it slightly, after which it is placed within the cylindrical opening 10A in the race member 10, as indicated in Figure 5.

The third step consists in applying pressure between the pressing dies 17, 18 while the ball 12 is yet at elevated temperatures so as to deform the annular triangularly cross-sectioned lips 10B, 10C and to press such lips into intimate contact with the heated ball 12 to such an extent as to lock such heated ball 12 in place, and to ultimately provide a large contact area between the ball and race.

Thereafter, after the various dies 15, 16 and 17, 18 are removed and the ball 12 assumes room temperature, such ball 12 is free to rotate within the race member 10 and in contact therewith, but at the same time, the ball 12 is maintained in the race member 10 by the annular lips 10B, 10C, as shown in Figures 2 and 7.

In manufacturing bearings of this type it is desirable to obtain a large contact area between the race and the bearing, so that low unit uniform pressures may be developed without excess strain at any one particular point. Also, it is desirable to achieve a uniform and predetermined tolerance or spacing between the bearing and the race.

In accordance with the present invention, such predetermined tolerances may be obtained by: (1) heating the bearing as described above, (2) by inserting auxiliary plugs in the cylindrical opening 10A of the bearing in a manner described hereinafter, (3) by utilizing materials for the bearing and race having different temperature co-efficients, (4) by utilizing material for the race member with "spring back" properties in conjunction with a bearing member the dimensions of which do not change during the pressing or die-forming operations, and (5) by using a combination of any one of the four above enumerated expedients.

It has been observed that predetermined tolerances may be obtained by using an auxiliary plug 30 within the bearing 12 with or without heating the bearing. For example, the plug 30 may be press-fitted into the opening 12A and the bearing 12 then subjected to any one of the four methods described hereinabove, after which the auxiliary plug 30 is removed. For example, the closer the fit between the plug 30 and the bearing 12, the greater will be the resulting tolerance between the bearing and the race after the plug is removed; this is so, since the bearing is expanded greater amounts, the closer the original fit between the plug 30 and the bearing 12. In other words, the effect of inserting the plug 30 is the same as that produced by originally elevating the temperature of the bearing 12. It is thus apparent that not only may this plug method be used alone, but the ball heating method may be used in conjunction therewith.

In some instances, wherein the resulting bearing structure is intended to be operated at elevated or lowered temperatures, the proper tolerance or clearance at such elevated or lowered temperatures may be obtained by utilizing a material for the race having a different temperature coefficient than the temperature co-efficient of the bearing material. In such case it may be desirable, in fabricating the bearing, to heat only the race to allow the bearing member to be inserted into the race; then, when the race assumes room temperature, the bearing may be "frozen" in the race; but after the operating temperature is reached the bearing is free to move and has the predetermined clearance or tolerance.

Further, in the process mentioned briefly in (4) above, the proper tolerance or clearance dimensions may be obtained when the material used for forming the race possesses "spring back" properties. By "spring back" properties I mean the dimensional change which the race undergoes after the pressure of the forming dies is released. Such change in dimensions may be sufficient, under some circumstances, to provide the desired predetermined clearance between the race and the inner bearing member 12. Using this technique, it is desirable that the inner bearing member does not change appreciably in dimensions during or after the pressing operation, although there may be some slight dimensional change in the inner bearing member 12 with the desired result yet achieved.

Thus far, the methods and processes described herein were directed to the production of a bearing structure in which the inner bearing member 12 had a resulting cylindrical apertured portion 12A. It is obvious that the methods and processes described in conjunction therewith are equally applicable to the production of a bearing in which the spherical movable bearing member 12 is of the type shown in Figure 12. In Figure 12 it is noted that the bearing member 12 is solid and spherical and has an integrally formed shank adapted for convenient fastening. It is noted, however, that the so-called "plug" method is not applicable in obtaining predetermined tolerances where the bearing structure incorporates the type of bearing member shown in Figure 12. In all other respects the methods and processes described hereinabove are applicable. Further, since the bearing member shown in Figure 12 has an integrally formed shank, it becomes necessary to provide a slightly oversized aperture in one of the die members 17, 18 or 19, 20, as the case may be, through which such shank may extend. Such apertured portion in the die members cooperating with the shank serves to maintain the bearing member 12 in a central predetermined position.

While the shank of the bearing member shown in Figure 11 may be utilized to centrally maintain the bearing between the race members 10 during the die forming operations, a different expedient may be required for the same purpose when the bearing member 12 is centrally apertured. Such expedient may reside, as shown in Figure 5, in providing a relatively stationary supporting member 31 which passes through an oversized opening in the bottom die member 18 to allow freedom of movement of the die members 17, 18 while yet maintaining the centrally disposed bearing member 12 relatively stationary with respect to the race 10. This member 31 thus serves essentially as a platform upon which the bearing member 12 is supported in a position relatively stationary with the race member 10 while the bearing structure is being assembled.

For accomplishing the above purpose, it is noted that the die members 17, 18 each have a corresponding clearance opening 17A, 18A but yet have an arcuate shaped wall 17B, 18B conforming with the arcuate surface of the ball member 12, as illustrated in Figure 7, although such conformation is not necessary.

Initially, it is noted from a study of Figures 6 and 7, the die members 17, 18 bear directly against the triangularly cross-sectioned regions 10B, 10C, defining the mouth to the original cylindrical aperture 10A. As the dies 17, 18 move together such lips 10B, 10C are deformed and moved inwardly into such original cylindrical aperture 10A, while the body portion of the race member 10 is prevented from moving outwardly by the holding die members 15, 16.

While the method described above in connection with Figures 3–7 allows simultaneously the production of both retaining lips 10B, 10C, it is quite evident that such retaining lips 10B, 10C may be formed separately using die members of the type described herein, so as to, as indicated in Figure 8, first form the retaining lip 10C and thereafter deform the other lip 10B to convert it into a ball retaining lip.

Figures 9 and 10 illustrate the fact that instead of using a pair of race holding dies 15, 16 and a separate pair of pressing dies 17, 18, such two pairs of dies may be incorporated in a single pair 19, 20. In other words, the dies 19, 20 serve not only as holding dies but also as pressing dies and are suitably apertured to provide a clearance for the fastening stud 11. The action and function of the dies 19, 20 are exactly the same as those of the dies 15, 16 and 17, 18 considered together.

Figure 11 shows a modified structure of a race member 10 which has an internal circular lining 21 adapted to ultimately contact the bearing member 12. The race member 10 may be made of steel with the lining 21 of bronze, stainless steel, beryllium copper, brass or chromium, while the bearing structures 12 cooperating and contacting with such lining 21 may be of steel, bronze or stainless steel, the bearing member 12 preferably being harder than the material forming the lining 21. This lining 21 may be affixed to the race member 10 by conventional means, such as by electrolytic action, shrinking and the like, and when the lining is formed by electrolytic action the thickness may, for example, and not as a limitation, be in the range of three-thousandths of an inch to fifteen-thousandths of an inch.

The structure shown in Figure 11 may be formed around the inner bearing member 12 by using any one of the expedients described hereinabove.

Figure 14 shows a bearing made in any one of the different manners described hereinabove, with a needle bearing assembly 25 disposed therein. In the figures shown herein corresponding parts have identical reference numerals, and although a needle bearing is preferably mounted within the apertured ball 12, other types of bearing assemblies may be disposed therein, such as roller bearings, ball bearings, and the like. The needle bearing assembly 25 comprises a tubular sleeve 26 forming an inner raceway for a plurality of cylindrical needle bearing members 27, there being press-fitted a pair of rings 28, 29 on the ends of the sleeve 26 to retain the bearing members 27 and adapted to engage the race member 12, to thereby take up thrust forces.

As mentioned above, the bearing comprising the elements 10, 12 may be made in accordance with any one of the various methods described above.

While I prefer to press-fit the rings 28, 29 onto the sleeve 26, these ring members 28, 29 may, of course, be fastened to the sleeve 26 by other means such as, for example, by screw threads, grooves and retaining ring, peening, and the like.

If desired, annular sealing rings may be disposed between the ring members 28, 29, on the one hand, and the adjacent ends of the bearing members 27, on the other hand, to prevent the loss of lubricant and the entrance of undesirable foreign matter into the bearing.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In the art of manufacturing two piece rod end bearings of the universal type in which a ball shaped member is maintained by at least one lip integrally formed with a race member in which the ball shaped member is free to move, the steps comprising forming said race member originally with a cylindrical aperture therethrough, the opposite mouths of which are each defined by an annular lip of generally right angled triangularly shaped cross sectional area which extends axially and outwardly beyond the body of the race member, heating said ball shaped member to a temperature above room temperature, inserting said ball in said aperture, then pressing the outer edges of said lip to thereby press each of said lips inwardly into said aperture against said ball and locking said ball in place while said ball is at an elevated temperature to thereby form ball retaining lips for preventing movement of said ball shaped member from said aperture but allowing rotative movement of said ball in said aperture after said ball cools, and restraining outward movement of all portions of said race member while said lips are being pressed inwardly and being deformed to their final position to assure a true coining action between the lips and the ball shaped member.

2. In the art of manufacturing two piece rod end bearings of the universal type in which a ball shaped member is maintained by a lip integrally formed with a race member within which the ball shaped member is free to move, the steps comprising forming said race member originally with a cylindrical aperture with the mouth thereof defined by a lip of right angled triangularly shaped cross sectional area which extends axially and beyond the body of the race member, heating said ball shaped member and then pressing said lip inwardly into the said cylindrical aperture to form an annular retaining lip for said ball shaped member to such an extent that the ball shaped member is locked in said cylindrical aperture by said lip, and restraining outward movement of all portions of said race member while said lip is being deformed to its final position to assure a true coining action between the lip and the ball shaped member.

References Cited in the file of this patent

UNITED STATES PATENTS

| | | |
|---|---|---|
| 1,330,158 | Arnold | Feb. 10, 1920 |
| 1,936,863 | Skillman | Nov. 28, 1933 |
| 2,060,034 | Chandler | Nov. 10, 1934 |
| 2,061,758 | Eastman | Nov. 24, 1936 |
| 2,382,773 | Chambers | Aug. 14, 1945 |
| 2,398,364 | Elfstrom | Apr. 16, 1946 |
| 2,427,203 | Essig | Sept. 9, 1947 |
| 2,462,138 | Spangenberg | Feb. 22, 1949 |
| 2,536,821 | Rappl | Jan. 2, 1951 |